United States Patent
Nakano et al.

(10) Patent No.: US 10,660,345 B2
(45) Date of Patent: May 26, 2020

(54) PECTIN-CONTAINING ACIDIC MILK BEVERAGE AND PRODUCTION METHOD THEREOF

(71) Applicants: Kabushiki Kaisha Yakult Honsha, Minato-ku (JP); CP Kelco ApS, Lille Skensved (DK); NITTA GELATIN INC., Osaka-shi (JP)

(72) Inventors: Masatoshi Nakano, Tokyo (JP); Daichi Nihei, Tokyo (JP); Yukiko Kobayashi, Tokyo (JP); Claus Rolin, Koege (DK); Soko Ushiyama, Osaka (JP); Hiroyuki Mamiya, Osaka (JP)

( * ) Notice: Subject to any disclaimer, the term of this patent is extended or adjusted under 35 U.S.C. 154(b) by 0 days.

(21) Appl. No.: 14/414,556

(22) PCT Filed: Jul. 11, 2013

(86) PCT No.: PCT/JP2013/068968
§ 371 (c)(1),
(2) Date: Jan. 13, 2015

(87) PCT Pub. No.: WO2014/010669
PCT Pub. Date: Jan. 16, 2014

(65) Prior Publication Data
US 2015/0201636 A1    Jul. 23, 2015

(30) Foreign Application Priority Data
Jul. 13, 2012 (JP) ................................ 2012-157098

(51) Int. Cl.
| | |
|---|---|
| *A23C 9/154* | (2006.01) |
| *A23L 29/231* | (2016.01) |
| *A23C 9/137* | (2006.01) |
| *A23L 2/62* | (2006.01) |
| *A23L 2/38* | (2006.01) |

(52) U.S. Cl.
CPC ............ *A23C 9/1542* (2013.01); *A23C 9/137* (2013.01); *A23L 2/38* (2013.01); *A23L 2/62* (2013.01); *A23L 29/231* (2016.08); *A23Y 2220/17* (2013.01)

(58) Field of Classification Search
CPC ......... A23C 9/137; A23C 9/1542; A23L 2/38; A23L 1/0524; A23L 2/62; A23Y 2220/17
USPC ........................................................ 426/577
See application file for complete search history.

(56) References Cited

U.S. PATENT DOCUMENTS

| | | | |
|---|---|---|---|
| 6,083,540 A | 7/2000 | Christensen et al. | |
| 6,221,419 B1 | 4/2001 | Gerrish | |
| 6,268,195 B1 | 7/2001 | Christensen et al. | |
| 6,627,429 B1 | 9/2003 | Christensen et al. | |
| 7,371,402 B2 * | 5/2008 | Madsen ................... | A23G 9/34 424/439 |
| 8,518,465 B2 | 8/2013 | Nakano et al. | |
| 8,871,289 B2 | 10/2014 | Nakano et al. | |
| 2002/0009790 A1 | 1/2002 | Christensen et al. | |
| 2003/0157230 A1 | 8/2003 | Christensen et al. | |

FOREIGN PATENT DOCUMENTS

| | | |
|---|---|---|
| JP | 59-151837 A | 8/1984 |
| JP | 08-112059 A | 5/1996 |
| JP | 09-266779 A | 10/1997 |
| JP | 11-509102 A | 8/1999 |
| JP | 2002-525071 A | 8/2002 |
| WO | 97/03574 A1 | 2/1997 |
| WO | 00/15830 A1 | 3/2000 |
| WO | WO 00/39168 A1 | 7/2000 |

OTHER PUBLICATIONS

Joye et al. Carbohydrate Polymers 43 (2000) 337-342.*
Strom et al. Biomacromolecules 2007, 8, 2668-2674.*
Food Industry Catalog CP Kelco, 2007, p. 7 Google search, accessed Sep. 23, 2018.*
International Search Report dated Oct. 8, 2013 in PCT/JP2013/068968 filed Jul. 11, 2013.
Extended European Search Report dated Apr. 29, 2016 in Patent Application No. 13816006.4

* cited by examiner

*Primary Examiner* — Subbalakshmi Prakash
(74) *Attorney, Agent, or Firm* — Oblon, McClelland, Maier & Neustadt, L.L.P.

(57) ABSTRACT

An object is to provide an acid milk beverage, which shows no precipitation or aggregation and reduced whey separation, and which has a refreshing texture, even in cases where the acid milk beverage has a low solids-not-fat concentration. An acid milk beverage characterized by containing an acid milk beverage base and a pectin having an intrinsic viscosity of 5.9 to 8.5, a degree of esterification of 74 to 80, and a calcium reactivity of 230 or less is provided.

6 Claims, No Drawings

PECTIN-CONTAINING ACIDIC MILK BEVERAGE AND PRODUCTION METHOD THEREOF

TECHNICAL FIELD

The present invention relates to an acid milk beverage which has excellent quality stability such that aggregation or precipitation of milk protein is not produced, and which has good taste, in particular, even in cases where the beverage has a particularly low solids-not-fat concentration, and a method for producing the same.

BACKGROUND ART

Acid milk beverages of a type containing living microbes, such as a fermented milk, a lactic acid bacteria beverage and a yogurt have been widely taken as a healthy drink which has physiological activities, such as an effect of calming intestinal disorders and immunopotentiative action.

In addition, various types of acid milk beverages have been proposed for responding to diversifying customer preferences. Among them, acid milk beverages of a type which contains a low solids-not-fat have also been developed.

However, dispersibility of milk protein usually becomes unstable under an acid condition, and therefore, in an acid milk beverage, there is a problem of precipitation, aggregation, separation of whey, and the like being easily produced. When the solids-not-fat content is low, distances between the milk proteins are long and therefore the repulsive forces between the electric charges are weak and precipitation or aggregation is easily produced.

The above-mentioned precipitation, aggregation or whey separation not only deteriorate the appearance significantly but also affect the taste upon drinking and further deteriorate the refreshing feel. Accordingly, methods of using various thickening stabilizers have been proposed for improving the problem. Specifically, a method of using carboxymethyl cellulose (CMC) has been proposed (Patent Documents 1 and 2).

However, when CMC was used as described above, a product having a refreshing texture could not be obtained. In particular, such a product had a property of becoming gel in a low pH region, and it was more difficult to obtain a product having a refreshing texture.

CITATION LIST

Patent Document

Patent Document 1: JP-A-59-151837
Patent Document 2: JP-A-9-266779

SUMMARY OF INVENTION

Technical Problem

Accordingly, an object of the present invention is to provide an acid milk beverage, which shows no precipitation, aggregation, whey separation, or the like, and which has a refreshing texture, even in cases where the acid milk beverage has a low solids-not-fat concentration.

Solution to Problem

As a result of intensive studies for achieving the object above, the present inventors found that the object can be achieved by incorporating a pectin having certain properties into an acid milk beverage, thereby completing the present invention.

That is, the present invention is directed to an acid milk beverage characterized by including an acid milk beverage base and a pectin having an intrinsic viscosity of 5.9 to 8.5, a degree of esterification of 74 to 80, and a calcium reactivity of 230 or less.

The invention is also directed to a method for producing an acid milk beverage, the method being characterized by including adding a pectin having an intrinsic viscosity of 5.9 to 8.5, a degree of esterification of 74 to 80, and a calcium reactivity of 230 or less to an acid milk beverage base.

Furthermore, the invention is directed to a method for stabilizing an acid milk beverage, the method being characterized by including adding a pectin having an intrinsic viscosity of 5.9 to 8.5, a degree of esterification of 74 to 80, and a calcium reactivity of 230 or less to an acid milk beverage base.

Advantageous Effects of Invention

The acid milk beverage of the invention shows no precipitation, aggregation, whey separation, or the like, and has a refreshing texture, even in cases where the acid milk beverage has a low solids-not-fat concentration, therefore being suitable for daily intake.

In addition, for this acid milk beverage, the production process is simple and requires no facility investment and the like.

DESCRIPTION OF EMBODIMENT

The acid milk beverage of the invention contains an acid milk beverage base and a pectin which has an intrinsic viscosity of 5.9 to 8.5, a degree of esterification of 74 to 80, and a calcium reactivity of 230 or less. In this invention, the "acid milk beverage" refers to a final product containing an acid milk beverage base and the above-mentioned pectin, and is to be distinguished from the "acid milk beverage base" which is free from pectin. The acid milk beverage base used in the acid milk beverage of the invention is not particularly limited, as long as it is any one of the following acid raw material milks as it is or it is obtained by diluting any one thereof with water or the like. Examples thereof include one which contains 3 to 16% by mass (hereinafter represented simply by "%") of solids-not-fat and whose pH is adjusted to 3 to 5.

(1) An acid raw material milk of a living microbes type, obtained by subjecting a liquid milk originated in animals or plants, such as cow's milk, goat's milk, sheep's milk and soybean milk, a skim milk powder, a total milk powder or a milk powder, a milk reduced from concentrated milk, or the like thereof, to an action of microbes such as lactic acid bacteria and bifidobacteria.

(2) An acid raw material milk of a killed microbes type, obtained by sterilizing the acid raw material milk of (1).

(3) An acid raw material milk, obtained by simply adding an acidity agent of various types to the above milk or the like.

In the production of (1) and (2) among the above acid raw material milks, examples of the microbes such as lactic acid bacteria and bifidobacteria used for the milk or the like include, but not limited to: bacteria including, genus *Lactobacillus* bacteria such as *Lactobacillus casei*, *Lactobacillus mali*, *Lactobacillus acidophilus*, *Lactobacillus delbrueckii* subsp. *bulgaricus* and *Lactobacillus helveticus*; genus *Streptococcus* bacteria such as *Streptococcus thermo-*

*philus*; genus *Lactococcus* bacteria such as *Lactococcus lactis* subsp. *lactis* and *Lactococcus lactis* subsp. *Cremoris*; genus *Enterococcus* bacteria such as *Enterococcus faecalis*; genus *Bifidobacterium* bacteria such as *Bifidobacterium breve*, *Bifidobacterium bifidum* and *Bifidobacterium longum*; genus *Bacillus*; genus *acetobacter*; and genus *Gluconobacter*; and yeasts including genus *Saccharomyces* and genus *Candida*. Any of these microbes can be suitably used. These microbes may be used alone or in combination of two or more thereof. Among the above microbes, when at least one selected from *Lactobacillus casei*, *Lactobacillus acidophilus*, *Lactobacillus delbrueckii* subsp. *bulgaricus*, and *Streptococcus thermophiles* are used, a good taste is provided, and therefore these bacteria are preferred.

A fermentation method for subjecting a milk or the like to an action of the microbes is not particularly limited, as long as it is a method used for manufacturing an ordinary fermented milk food and drink product. For example, a method to be used may be appropriately selected from methods suitable for microbial fermentation, such as stationary fermentation, stirring fermentation, shaking fermentation and aerating fermentation, and among others, stationary fermentation is preferably used.

In addition, fermentation conditions for subjecting a milk or the like to an action of the microbes are not particularly limited, as long as they are conditions used for manufacturing an ordinary fermented milk food and drink product. For example, the fermentation may be performed at a temperature of 30 to 40° C. in a manner that keeps the pH of 3 to 5.

Furthermore, in cases where an acid raw material milk of (3) is used as an acid raw material milk of the acid milk beverage, an acidity agent of various types which are used for an ordinary food product may be added to the milk or the like, for example, such that the pH is kept between 3 and 5. Specific examples of the acidity agent include a juice of various fruits such as apple, blueberry and a citrus, an extract thereof or a mixture thereof, an organic acid such as lactic acid, citric acid, malic acid, tartaric acid, gluconic acid and succinic acid, an inorganic acid such as phosphoric acid, and the like.

In the above acid raw material milk, food materials which are usually blended in various food and drink products may be blended during or after preparing the acid raw material milk of various kinds, to the extent that the effects obtained by the invention are not impaired. Examples of the food material include glucides such as sugar; high intensity sweeteners such as aspartame, thaumatin, sucralose, acesulfame K and stevia; dietary fibers such as digestion resistant dextrin; emulsifiers such as a sugar fatty acid ester, a glycerol fatty acid ester, a polyglycerol fatty acid ester, sorbitan fatty acid ester and lecithin; milk fats such as cream, butter and sour cream; acidulants such as citric acid, lactic acid, acetic acid, malic acid, tartaric acid and gluconic acid; vitamins such as vitamin A, vitamin B substances, vitamin C and vitamin E substances; minerals such as calcium, magnesium, zinc, iron and manganese; flavors such as yogurt type, berry type, orange type, Chinese quince type, perilla type, citrus type, apple type, mint type, grape type, apricot type, pear, custard cream, peach, melon, banana, tropical type, herb type, black tea, and coffee type flavor.

On the other hand, the pectin used for the acid milk beverage of the invention is a pectin having an intrinsic viscosity of 5.9 to 8.5, a degree of esterification of 74 to 80, and a calcium reactivity of 230 or less, preferably having an intrinsic viscosity of 5.9 to 8.2, a degree of esterification of 74 to 77.8, and a calcium reactivity of 40 to 230, and more preferably having an intrinsic viscosity of 6.5 to 8.2, a degree of esterification of 75 to 77.8, and a calcium reactivity of 40 to 110. Incidentally, the intrinsic viscosity, the degree of esterification, and the calcium reactivity of the pectin described above are measured by the methods described in Examples. In addition, the pectin used in the acid milk beverage of the invention is not particularly limited as long as it has the properties as described above. For example, YM-NN-12 (item number) from CP kelco or the like may be used, or one produced in the following manner may be used.

In order to produce the pectin, first of all, a dried plant material is put into a container and water is added. Then, the mixture of the plant material and water is heated with stirring to thereby extract the pectin from the mixture. The mixture containing the pectin is then filtrated, and the filtrate is evaporated with an evaporator to concentrate the pectin in the solution. Finally, an alcohol is added thereto to precipitate the pectin, and the precipitation is dried under vacuum, whereby pectin powder is obtained. Examples of the plant material as a raw material of the pectin include peel of a citrus, sugar beet, sunflower, a vegetable, apple, and fruit of a citrus. Among them, peel of a citrus such as lime, lemon, grapefruit and orange is preferred, and peel of lemon is particularly preferred. The extraction conditions of the pectin are not particularly limited, but, for example, the extraction is preferably performed at a temperature of 50 to 90° C. at a pH of 1 to 3 for a time period ranging from 3 to 12 hours, and in particular it is preferably performed at a temperature of 72 to 73° C. at a pH of 1.97 to 2.31 for a time period ranging from 3 to 4 hours.

The content of the pectin in the acid milk beverage of the invention is, but not particularly limited to, for example, 0.2 to 0.35% (w/v), preferably 0.25 to 0.3% (w/v) based on the acid milk beverage as the final product, in view of the taste of the acid milk beverage.

The acid milk beverage of the invention only has to contain the acid milk beverage base as described above and the pectin having an intrinsic viscosity of 5.9 to 8.5, a degree of esterification of 74 to 80, and a calcium reactivity of 230 or less, and the solids-not-fat content is not particularly limited as long as the pH value is in an acidic region. From the viewpoint that aggregation or precipitation tends to occur when the pectin is not used, however, the solids-not-fat content of the acid milk beverage as a final product may be 5% or less, preferably 3 to 4%, and the pH value immediately after the production may be 3 to 5, and preferably 3.5 to 4.2.

The production method of the acid milk beverage of the invention is not particularly limited, and may be the same as an ordinary production method of acid milk beverage except that the pectin is added to the acid milk beverage base in any step. Incidentally, the method for adding the pectin is not particularly limited, and, for example, may be a method in which a syrup containing the pectin and a glucide such as sugar is prepared by an ordinary method and this syrup is added to the previously prepared acid milk beverage base. Alternatively, it is possible that a syrup containing the pectin is added to the acid milk beverage base, followed by homogenization.

The syrup containing the pectin and a glucide such as sugar may be prepared, for example, by dissolving the pectin and the glucide such as sugar in water previously heated to about 60° C. and subjecting the solution to plate sterilization at 112° C. for 10 seconds.

The acid milk beverage of the invention obtained in such a manner shows no precipitation, aggregation, whey separation or the like, and has a refreshing texture, even after storage at 10° C. for 28 days.

EXAMPLES

Hereinafter, the present invention will be described in detail with reference to Examples and the like. The invention is however by no means limited to the Examples and the like.

Example 1

Acid Milk Beverage:

On 15% skim milk powder medium (containing 3.5% glucose), a starter of *Lactobacillus casei* YIT9029 (this strain has been internationally deposited as FERM BP-1366 (dated May 1, 1981) to the Fermentation Research Institute, Agency of Industrial Science and Technology, Ministry of International Trade and Industry (current organization: International Patent Organism Depositary, National Institute of Advanced Industrial Science and Technology (NITE-IPOD), address: Central 6, 1-1, Higashi 1-chome, Tsukuba-shi, Ibaraki 305-8566. International Patent Organism Depositary moved to new address: Room 120, 2-5-8 Kazusakamatari, Kisarazu-shi, Chiba 292-0818, on Apr. 1, 2013.) was inoculated at 0.5% (viable cell count: $5.0 \times 10^6$/ml), and cultured at 37° C. until the pH reached 3.6, whereby an acid raw material milk was obtained. A syrup (dissolved in water so as to contain 4% of sugar, 5% of digestion resistant dextrin, and 0.04% of stevia) containing a pectin (item number: YM-NN-12 (CP Kelco), intrinsic viscosity: 7.2, degree of esterification: 76, calcium reactivity: 110, raw material: lemon peel) was then separately prepared. A mixture of 24 parts by weight of the acid raw material milk and 76 parts by weight of the syrup was subjected to homogenization at 15 MPa, whereby an acid milk beverage was obtained. In this acid milk beverage, the solids-not-fat content is 3.1%, the pH immediately after the production is 3.7, and the pectin content is 0.25% (w/v).

The resulting acid milk beverage showed no precipitation or aggregation and reduced whey separation, and had a refreshing texture and a good taste, even after storage at 10° C. for 28 days.

Production Example 1

Preparation of Pectin:

Dried pieces of lemon peel were put into a container and water was added thereto. The mixture of the citrus peel and water was heated with stirring to thereby extract pectin from the mixture (temperature: 72 to 73° C., pH: 1.97 to 2.31, time: 180 minutes). The mixture extracted was then filtrated. The filtrate was evaporated by an evaporator to concentrate the pectin in the solution. Alcohol was added to cause precipitation, and the precipitation was dried under vacuum to give each pectin of Products 1 to 12.

Incidentally, the intrinsic viscosity, the degree of esterification, and the calcium reactivity, of the pectin prepared above were measured as described below. The results were shown in Table 1.

<Intrinsic Viscosity>

The intrinsic viscosity is a viscosity value of a polymer solution at a point where the concentration of the polymer is assumed to be 0, which is determined by obtaining viscosity values of plural solutions of the polymer having different concentrations. The measurement was conducted in the following manner.

(Apparatus)
　FIPA apparatus: TDA302 (Viscotek)
　Pump: VE1121GPC (Viscotek)
　Autosampler and sample preparation module: AS3500 (Thermo Separation Products)
　Column: Bio Bases SEC60 (150×7.8 mm) (Thermo Separation Products) or Superdex Peptide (60×7.8 mm) (GE healthcare)
　Computer software: OmniSEC
(Reagent)
　Lithium hydroxide monohydrate: item number L4533 (Sigma-Aldrich)
　Glacial acetic acid: item number 1.00063 (Merck)
　Milli Q water
　Sodium azide: item number 8.22335 (Merck)
(Sample Preparation)
　(1) Pectin (40.0 mg) is weighed and put into 100 ml container.
　(2) Ethanol (100 µl) is added with stirring.
　(3) The temperature is kept at 75° C. with stirring.
　(4) A solvent (0.3 M lithium acetate buffer solution (pH 4.6): 40 ml) was added with gently stirring.
　(5) Gentle Stirring is continued at 75° C. for 30 minutes.
　(6) The mixture is cooled to room temperature.
(Calibration)

A calibration was performed using a dextran having a molecular weight of about 70000 (intrinsic refractive index increment: do/dc 0.147) and pullulans having a molecular weight of 212000 (dn/dc 0.145) and that of 47000 (dn/dc 0.145).

(Control of FIPA)

As a control standard, a dextran having a molecular weight of about 70000 dalton (2.0 mg/ml) was used. As a control sample, a pectin whose intrinsic viscosity was known (1.0 mg/ml) was used.

(Analysis Conditions)
　Solvent: 0.3 M lithium acetate buffer solution (pH 4.6)
　Flow rate: 1.0 ml/min
　Pectin concentration: 1.0 mg/ml
　Temperature: 37° C.
　Injection amount: using 25 µl sample loop <Degree of Esterification>

Pectin contains polygalacturonic acid as a main component, and carboxyl groups of the galacturonic acid are partially changed into methyl ester. The degree of esterification shows the rate of the esterification. The measurement was conducted in the following manner.

(Apparatus)
　Analytical balance
　Glass beaker (250 ml)
　Glass vessel for measurement (100 ml)
　Vacuum pump
　Suction flask
　Crucible with glass filter No. 1 (Buchner funnel and filter paper)
　Stopwatch
　Test tube
　Drying cabinet of 105° C.
　Desiccator
　Magnetic stirrer and magnet
　Burette (10 ml, precision±0.05 ml)
　Pipettes (20 ml, 10 ml)
(Reagent)
　Deionized water
　60% and 100% Isopropanol (IPA)
　0.5 N and 37% Hydrogen chloride (HCl)

0.1 N and 0.5 N Sodium hydroxide (NaOH) (calibrated to 4 decimal places)
0.1 N Silver nitrate (AgNO$_3$)
3 N Nitric acid (HNO$_3$)
0.1% Phenol phthalein (indicator)
(Measurement Method)

(1) Pectin (2.0 g) is weighed into a 250 ml glass beaker.
(2) Acid alcohol (100 ml) is added and the mixture is stirred using a magnetic stirrer for 10 minutes.
(3) The filtrate is dried completely and a crucible with glass filter is weighed.
(4) The beaker is rinsed with 15 ml of acid alcohol, and this work is repeated 6 times.
(5) Washing with 60% IPA is repeated until the filtrate becomes free from chloride (about 500 ml).
(6) The chloride test is performed by putting about 10 ml of the filtrate into a test tube, adding about 3 ml of 3N HNO$_3$ and further adding 2 or 3 drops of AgNO$_3$.
(7) When the solution is clear, the filtrate does not contain chloride, and otherwise, silver chloride is precipitated.
(8) Then, washing with 20 ml of 100% IPA is performed.
(9) The sample is dried at 105° C. for 2 and a half hours.
(10) After the drying, the crucible is weighed and cooled in a desiccator.
(11) The sample (0.40 g) is precisely weighed into a 250 ml glass beaker (Two samples are weighed out for dual measurement).
(12) The pectin is immersed in about 2 ml of 100% IPA, and about 100 ml of distilled water not containing deionized water is added with stirring by a magnetic stirrer.
(13) Phenol phthalein indicator (5 drops) is added, and the mixture is titrated with 0.1 N NaOH until the color changes (the titration volume is recorded as titration volume V1).
(14) While stirring, 0.5 N NaOH (20.00 ml) is added and the solution is allowed to stand for 15 minutes. During standing still, the sample has to be covered with foil.
(15) Then, 0.5 N HCl (20.00 ml) is added and the solution is stirred by a magnetic stirrer until the color disappears.
(16) Phenol phthalein (3 drops) is added, and the solution is titrated with 0.1 N NaOH until the color changes (the titration volume is recorded as titration volume V2).
(17) Next, a blind test (dual measurement) is carried out as follows.
(18) Phenol phthalein (3 drops) is added to 100 ml of deionized water, and the solution is titrated with 0.1 N NaOH in a 250 ml beaker until the color changes (1 to 2 drops); and then, 0.5 N NaOH (20.00 ml) is added and the solution is allowed to stand for 15 minutes without touching the sample. During standing still, the sample has to be covered with foil.
(19) Then, 0.5 N HCl (20.00 ml) and phenol phthalein (3 drops) are added, and the mixture is titrated with 0.1 N NaOH until the color changes. The volume of the 0.1 N NaOH used is recorded as B1.
(Expression)

The degree of esterification is calculated with the following expression.

Degree of esterification (%)=(V2−B1)×100/V1    [Expression 1]

<Calcium Reactivity>

Pectin reacts with calcium ions and aggregates (because the negative charges of the pectin molecules react with the positive charges of the calcium ions). The calcium reactivity in the invention is expressed by a viscosity value of a pectin solution measured a certain period after an amount of calcium is added to an amount of the pectin solution. The measurement was conducted in the following manner.

(Measurement Method)

(1) A pectin that is not standardized (0.64 g) is weighed into a glass vessel (The standardization means that glucose or sucrose is blended into a pectin in order to make gel strength of the pectin a certain value).
(2) Isopropanol (5.0 ml) is added.
(3) The mixture is stirred and mixed while boiled water (130 ml) is added. The glass vessel is covered with a lid during all the works of (3) to (5).
(4) One minute after the addition of the boiled water in (3), 3.0 M sodium acetate buffer solution (pH 3.60) (20 ml) is added.
(5) One minute after the addition of the buffer solution, the glass vessel is placed in a hot water of 75° C., the mixture was mixed for 8 to 12 minutes to confirm that the pectin is dissolved.
(6) The solution in the glass vessel is stirred with a vortex mixer, a calcium chloride solution (5 ml) is added within 2 seconds, and the mixture is mixed for 10 seconds.
(7) The glass vessel is placed in a water tank of 5° C. within 5 minutes after the mixing of (6), and allowed to stand for 16 to 22 hours. The height of the water surface of the tank and that of the water surface in the glass vessel have to be equal.
(8) The viscosity is measured at 5° C. using Brookfield viscometer (Brookfield LVT) with a No. 2 spindle at 60 rpm.
(9) The viscosity measured in (8) (CP) is taken as the value of the calcium reactivity.

TABLE 1

|  | Intrinsic viscosity (dl/g) | Degree of esterification (%) | Calcium reactivity (cp) |
| --- | --- | --- | --- |
| Product 1 | 7.6 | 75.8 | 54 |
| Product 2 | 6.2 | 74.6 | 40 |
| Product 3 | 4.5 | 72.1 | 25 |
| Product 4 | 5.0 | 73.2 | 163 |
| Product 5 | 5.9 | 74.0 | 44.5 |
| Product 6 | 6.8 | 74.0 | 594 |
| Product 7 | 7.8 | 76.5 | 104 |
| Product 8 | 8.2 | 76.5 | 91 |
| Product 9 | 8.0 | 77.8 | 55 |
| Product 10 | 7.2 | 75.7 | 43 |
| Product 11 | 7.5 | 76.5 | 229 |
| Product 12 | 7.4 | 75.8 | 177 |

Example 2

Preparation of Acid Milk Beverage:

A starter of *Lactobacillus casei* YIT9029 (FERM BP-1366) was inoculated on a 15% skim powdered milk medium (containing 3.5% glucose) at 0.5% (viable cell count: 5.0×10$^6$/ml), and cultured at 37° C. until the pH reached 3.6, whereby an acid raw material milk was obtained. Then, a syrup containing each pectin of Products 1 to 12 (the syrup containing 7% sugar) was separately prepared. A mixture of 24 parts by weight of the acid raw material milk and 76 parts by weight of the syrup was subjected to homogenization at 15 MPa, whereby an acid milk beverage was obtained. In each acid milk beverage, the solids-not-fat content was 3.2%, the pH value immediately after the production was 3.8, and the pectin content was 0.25% (w/v). As a control, similar acid milk beverages were obtained, using a conventional pectin (CP Kelco, intrinsic viscosity: 5.7, degree of esterification: 72, calcium reactivity: 169) and a soybean polysaccharide in place of a pectin (San-Ei Gen F.F.I., Inc.), respectively.

These acid milk beverages were stored at 10° C. for 28 days, and thereafter the amount of whey separation (the height of the whey from the top of the container (mm)) and the amount of the precipitation ((the weight of the precipitation on the bottom of the container)/(the total weight of the content)×100(%)) were determined. In addition, the whey separation and the precipitation were comprehensively evaluated with the following evaluation criteria. The results were shown in Table 2.

<Evaluation Criteria of Physical Properties>
(Rating) (Detail)
Good: exhibiting good stability of physical properties (having commercial value)
Moderate: neither good nor poor
Poor: exhibiting poor stability of physical properties (not having commercial value)

TABLE 2

|  | Separation of whey (mm) | Amount of precipitation (%) | Evaluation of physical properties |
|---|---|---|---|
| Product 1 | 9 | 1.0 | Good |
| Product 2 | 11 | 1.2 | Good |
| Product 3 | Aggregate or Separate | Aggregate or Separate | Poor |
| Product 4 | Aggregate or Separate | Aggregate or Separate | Poor |
| Product 5 | 14 | 1.6 | Moderate |
| Product 6 | Aggregate or Separate | Aggregate or Separate | Poor |
| Product 7 | 7 | 1.0 | Good |
| Product 8 | 6 | 1.0 | Good |
| Product 9 | 6 | 0.9 | Good |
| Product 10 | 10 | 1.2 | Good |
| Product 11 | 10 | 1.0 | Good |
| Product 12 | 9 | 1.0 | Good |
| Conventional pectin | Aggregate or Separate | Aggregate or Separate | Poor |
| Soybean polysaccharide | 17 | 1.2 | — |

As is apparent from the results in Table 2, it was found that products 1, 2, 5, and 7 to 12 exhibited good stability of physical properties and were not impaired in the commercial value, even after the storage of the product.

Example 3

Preparation of Acid Milk Beverages

A starter of *Lactobacillus casei* YIT9029 was inoculated on a 15% skim powdered milk medium (containing 3.5% glucose) at 0.5% (viable cell count: 5.0×10⁶/ml), and cultured at 37° C. until the pH reached 3.6, whereby an acid raw material milk was obtained. Then, plural syrups containing different concentrations of the pectin of Product 1 of Production Example 1 (the syrup containing 7% sugar) were separately prepared. A mixture of 24 parts by weight of the acid raw material milk and 76 parts by weight of each syrup was subjected to homogenization at 15 MPa, whereby an acid milk beverage was obtained. In each acid milk beverage, the solids-not-fat content was 3.2%, the pH value immediately after the production was 3.8, and the pectin content was 0, 0.25, 0.3, or 0.35% (w/v).

These acid milk beverages were stored at 10° C. for 14 days or 28 days, and thereafter the amount of whey separation and the amount of the precipitation were determined in the same manner as in Example 2. In addition, the taste and the stability of physical properties were evaluated with the following evaluation criteria. The results were shown in Table 3.

<Taste Evaluation Criteria>
(Rating) (Detail)
Good: having good taste
Moderate: neither good nor poor
Poor: having poor taste
<Evaluation Criteria of Physical Properties>
(Rating) (Detail)
Good: exhibiting good stability of physical properties (having commercial value)
Moderate: neither good nor poor
Poor: exhibiting poor stability of physical properties (not having commercial value)

TABLE 3

|  | Storage period (days) | Amount of pectin added | | | |
|---|---|---|---|---|---|
|  |  | 0% | 0.25% | 0.30% | 0.35% |
| Separation of whey (mm) | 14 | 7.0 | 5.0 | 4.0 | 4.0 |
|  | 28 | 18.0 | 9.0 | 6.0 | 5.5 |
| Precipitation (%) | 14 | 0.99 | 0.84 | 0.81 | 0.80 |
|  | 28 | 0.94 | 0.90 | 0.85 | 0.83 |
| Taste |  | Good | Good | Good | Good to Moderate |
| Physical properties |  | Poor | Good | Good | Good |

From the results in Table 3, the stability of physical properties was good when the amount of the pectin added was 0.25 to 0.35%. As for the taste, although the texture tended to be heavy as the amount of the pectin added was increased, the taste remained within the allowable range in an amount up to 0.35%.

INDUSTRIAL AVAILABILITY

The acid milk beverage of the invention shows no precipitation or aggregation and reduced whey separation, and has a refreshing texture, therefore being suitable for daily intake.

The invention claimed is:
1. An acid milk beverage, comprising:
   an acid milk beverage base; and
   a pectin obtained by an aqueous extraction from a plant material at a temperature of 50 to 90° C., a pH of 1 to 3 and a time of from 3 to 12 hours;
   wherein
   a pH of the acid milk beverage is from 3.5 to 4.2,
   a solids-not-fat content of the acid milk beverage is from 3 to 4% by mass,
   carboxyl groups of the extracted pectin are randomly arranged on the pectin backbone,
   an intrinsic viscosity of the extracted pectin is from 5.9 dl/g to 8.5 dl/g,
   a degree of esterification of the extracted pectin is from 74% to 80%, and
   a calcium reactivity of the extracted pectin is from 40 to 110 cp.
2. The acid milk beverage according to claim 1, wherein a content of the extracted pectin is from 0.25 to 0.3% (w/v).
3. A method for producing an acid milk beverage, the method comprising:
   adding an extracted pectin to an acid milk beverage base;
   wherein
   a pH of the acid milk beverage is from 3.5 to 4.2,
   the beverage has a solids-not-fat content of 3 to 4% by mass, carboxyl groups of the pectin are randomly arranged along the pectin backbone, the extracted pectin is obtained by an aqueous extraction from a plant material at a temperature of 50 to 90° C., a pH of 1 to 3 and a time of from 3 to 12 hours, an intrinsic viscosity of the extracted pectin is from 5.9 dl/g to 8.5 dl/g, a degree of esterification of the extracted pectin is from 74% to 80%, and a calcium reactivity of the extracted pectin is from 40 to 110 cp.

4. A method for stabilizing an acid milk beverage, the method comprising:

adding 0.2 to 0.35% (w/v) based on the stabilized acid milk beverage of an extracted pectin to an acid milk beverage base;

wherein a pH of the acid milk beverage is from 3.5 to 4.2, the beverage has a solids-not-fat content of 3 to 4% by mass, carboxyl groups of the pectin are randomly arranged along the pectin backbone, the extracted pectin is obtained by an aqueous extraction from a plant material at a temperature of 50 to 90° C. a pH of 1 to 3 and a time of from 3 to 12 hours, an intrinsic viscosity of the extracted pectin is from 5.9 dl/g to 8.5 dl/g, a degree of esterification of the extracted pectin is from 74% to 80%, and a calcium reactivity of the extracted pectin is from 40 to 110 cp.

5. The method of claim 3, wherein the extracted pectin is added to the acid milk beverage base as a solution in water with a glucide, wherein the extracted pectin glucide solution is subjected to plate sterilization at 112° C. for 10 seconds.

6. The method of claim 4, wherein the extracted pectin is added to the acid milk beverage base as a solution in water with a glucide, wherein the extracted pectin glucide solution is subjected to plate sterilization at 112° C. for 10 seconds.

* * * * *

UNITED STATES PATENT AND TRADEMARK OFFICE
CERTIFICATE OF CORRECTION

PATENT NO. : 10,660,345 B2
APPLICATION NO. : 14/414556
DATED : May 26, 2020
INVENTOR(S) : Masatoshi Nakano et al.

Page 1 of 1

It is certified that error appears in the above-identified patent and that said Letters Patent is hereby corrected as shown below:

On the Title Page

Item (73), the Assignee is incorrect. Item (73) please insert:
-- (73) Assignee: Kabushiki Kaisha Yakult Honsha, Minato-ku (JP); CP Kelco ApS, Lille Skensved (DK); NITTA GELATIN INC., Osaka-shi (JP) --

Signed and Sealed this
Fifth Day of January, 2021

Andrei Iancu
*Director of the United States Patent and Trademark Office*